UNITED STATES PATENT OFFICE.

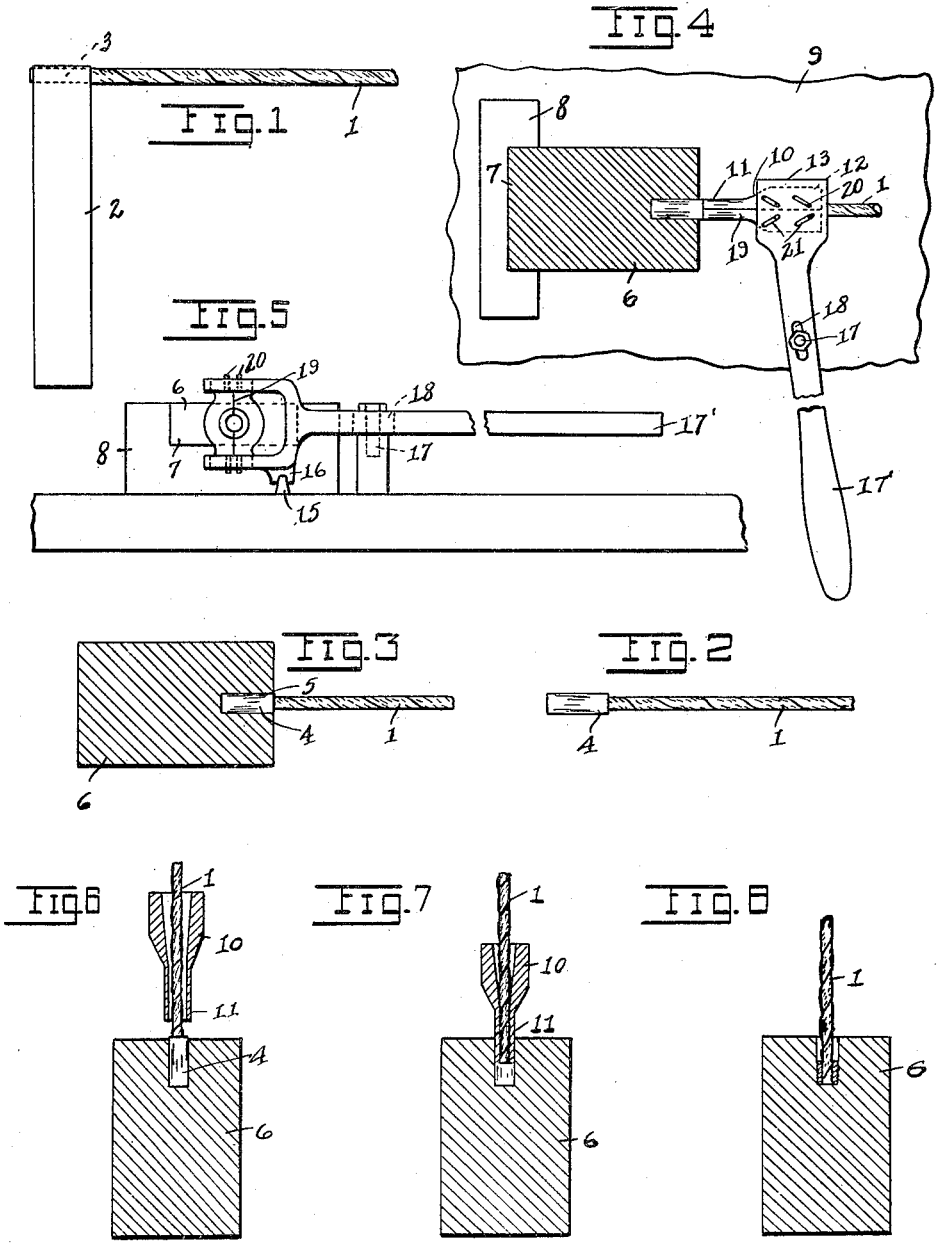

PHILIP P. NUNGESSER, OF CLEVELAND HEIGHTS, OHIO, ASSIGNOR TO NATIONAL CARBON COMPANY, INC., A CORPORATION OF NEW YORK.

BRUSH CONNECTION.

1,372,366.  Specification of Letters Patent.  Patented Mar. 22, 1921.

Application filed June 23, 1919. Serial No. 305,993.

*To all whom it may concern:*

Be it known that I, PHILIP P. NUNGESSER, a citizen of the United States, residing at Cleveland Heights, in the county of Cuyahoga and State of Ohio, have invented a certain new and useful Improvement in Brush Connections, of which the following is a full, clear, and exact description.

This invention relates to brushes for dynamo electric apparatus, and more particularly to an arrangement for fastening a conductor such as a wire or flexible cable to a brush to provide a suitable terminal or pigtail connection.

In brushes having flexible cables the connection between the brush and the cable must be mechanically strong and durable, and the contact resistance must be low in order to prevent undue heating of the brush. When in service brushes are subjected, as a rule, to considerable vibration and jarring, and occasionally to relatively high temperatures. When the latter conditions exist, connections involving the use of solder, or low melting materials, are unsatisfactory. Another important requirement of a suitable connection is low cost.

The object of the present invention is to secure a connection which is simple in structure, easy to apply, cheap, durable and adapted to withstand various kinds of service.

Further objects and advantages of the present connection will appear in the following description and accompanying drawings illustrating the invention.

In the drawings:—

Figure 1 is a plan view of the cable and a strip of foil before the foil is applied thereto.

Fig. 2 is a view showing a brush cable with foil rolled on one end.

Fig. 3 shows a brush having a cable with the foil on its end inserted in a hole in the brush.

Fig. 4 is a somewhat diagrammatic view showing an arrangement for forcing or compressing the foil in the brush hole to form the connection.

Fig. 5 is an end view of the apparatus shown in Fig. 4.

Fig. 6 is a fragmentary cross section of a portion of the brush and tool for compressing the foil, showing the relative positions before the foil is compressed.

Fig. 7 is a fragmentary cross section of the brush, cable and tool, after the foil is compressed.

Fig. 8 is a cross section of the finished brush and connection.

In accordance with the present invention I utilize thin sheet metal commonly known as metal foil, as a means for fastening the cable to the brush. Preferably the thin sheet metal used is rolled sheet copper having a thickness of about two-thousandths of an inch, although other flexible, electrically conducting materials which do not melt at the temperature to which the brush is subjected, may be substituted for the sheet copper. For example, lead, tin, iron, alloys and other materials may be mentioned, although other suitable substances may be readily selected upon a consideration of the electrical and mechanical properties of the materials in question, and the service requirements. Evidently gold, silver and other expensive metals or alloys are well adapted for the purpose electrically and mechanically, but are too expensive for extensive use. Taking into consideration all of the various requirements, I find that copper is best adapted for making the connection.

In Fig. 1 a piece of stranded copper wire cable 1 which forms the brush pigtail is shown in conjunction with a strip 2 of thin sheet copper which is utilized to connect the cable to the brush. The strip 2 is preferably wound tightly around the end 3 of the cable, the resulting article being shown in Fig. 2. The wrapped end 4 is then inserted in a hole 5 drilled in the end of the brush 6 and of a diameter substantially the same as the coiled end 4. In Fig. 3 I have illustrated a method of inserting a single cable arranged perpendicularly in one end of a brush, but it will be understood that the connection may be used with various numbers of cables which may be inserted in holes drilled in the brush in suitable positions and directions. The width of the strip 2 will be varied depending on the depth of the hole 5, but as a rule the depth of the hole and width of the strip will be substantially the same, although this is not an essential requirement. Wrapping the strip on the cable and inserting the wrapped end in the brush hole are steps which may be conveniently carried on consecutively by the same person.

The connection is completed by forcing a hollow tube or tool 10 into the hole in the brush in any convenient manner. By this action the strip 2 around the cable is pressed into the hole without difficulty. The force required to do this has not been measured, but with a 1/32 inch cable and 1/4 inch hole I find that, with the apparatus shown in Fig. 4 which will be described hereafter, the connection is easily made by the manual application of pressure by means of a three or four to one lever. The action of the tool compresses the tightly wrapped foil into the hole to about one-half or two-thirds of its original length. The compression of the foil forces it into intimate contact with the brush and the cable, producing a low resistance connection which will withstand any mechanical strains to which it is ordinarily subjected. When exposed to high temperatures the contact is not impaired. In fact, the compressed foil appears to have enough elasticity to hold the cable firmly in place and to take care of expansion or contraction of the hole due to temperature variations. Examination of the connection by breaking the brush shows that the sheet metal or foil is irregularly kinked or wrinkled up. Some of the sharp edges formed seem to be pressed into the surface of the brush hole and cable, as roughly indicated in Fig. 8.

The device shown in Figs. 4 and 5 for completing the connection illustrates, by way of example, a simple arrangement for finishing the connection, and the invention evidently is not limited thereto. The brush with the cable inserted as shown in Fig. 3, will be fitted in a suitable recess 7 in a block 8 projecting from a support 9. The free end of the cable is then passed through a hollow tool 10. At the smaller end 11 the diameter of the hole is slightly larger than the diameter of the cable and the outside diameter of the pointed end of the tool is slightly less than the hole 5 of the brush. The tool has a large end 12 which is fastened in the end 13 of a lever 14. To cause the end 12 of the lever to move in a straight line and in alinement with the brush hole, a tongue 15 is placed on the support 8 and adapted to coöperate with a groove 16 on the end of the tool. The pivot point 17 of the handle 17' is adapted to move in a slot to permit the straight line movement of the end 13, previously set forth. On account of the small clearance between the cable and the hole in the inside of the tool, it is rather difficult to insert the cable and it is therefore preferable to provide means for facilitating such insertion. In the illustration I have shown a tool split through the center at 19. The large end of the tool has eight pins 20 passing through a similar number of slots 21 arranged in two sets on opposite sides of the split center, which are adapted to open and close the tool.

In order to compress the metal and complete the connection, the handle 22 is moved toward the right to force the end 11 toward the brush. The action of the slots 21 draws the pins together to close the split tool, permitting the small end to enter the brush hole as in Fig. 7. When the connection is completed by moving the handle far enough to apply the proper pressure, the tool is withdrawn by moving the handle to the left. Movement in this direction separates the two halves of the tool as indicated in Fig. 6, and leaves a space large enough to permit the cable to be readily inserted.

In the prior description no reference has been made to the composition of the brush, as in general this is immaterial. However, the connection is especially adapted for use with metal containing brushes which as a rule consist largely of copper. In such instances, the entire brush, cable and connection is made of copper which is highly desirable. The construction, however, is well suited to carbon brushes, although with very thin brushes care must be used to compress the sheet metal without cracking the brush. Very thin unperforated sheet metal appears to be most advantageous in making the connection, but perforated sheet metal, wire gauze, or metal somewhat thicker than that previously specified may be used. These will be referred to generally in the claims by the term thin sheet metal and other equivalent materials.

Having described my invention, what I claim is:—

1. The method of attaching a conductor to a brush, which consists in surrounding with thin sheet metal the portion of the conductor contained in a hole in the brush and compressing the sheet metal into said hole.

2. The method of attaching a conductor to a brush, which consists in wrapping a number of turns of thin sheet metal around the end of a conductor, inserting said wrapped end in a hole formed in the brush, and applying pressure to the sheet metal to press it into intimate contact with the brush and conductor.

3. The method of attaching a conductor to a brush, which consists in wrapping a strip of thin sheet metal around the end of the conductor, inserting said wrapped portion in a hole in the brush of substantially the same diameter as the wrapped portion, and applying pressure to the sheet metal to press it into intimate contact with the brush and conductor.

4. The method of attaching a conductor to a brush, which consists in wrapping a number of turns of thin sheet copper around the end of the conductor, inserting said wrapped end in a hole formed in the brush, and applying pressure to the end of the sheet metal through said hole, to press it into intimate contact with the brush and conductor.

5. The method of attaching a conductor to a brush which consists in wrapping a strip of copper foil having a thickness of less than .010″ to the end of the conductor, inserting said wrapped end in a hole formed in the brush, and applying pressure to the edges of the copper foil whereby the foil becomes kinked to produce intimate contact between the brush and conductor.

6. The method of attaching a conductor to a brush, which consists in surrounding with thin copper foil the end of a conductor contained in a hole in the brush, inserting the conductor through an opening in a hollow compression member, and then applying pressure to the compression member to compress the copper foil into intimate contact with the brush and conductor.

7. The combination of a brush having an opening therein, a conductor in said opening and a compressed mass of thin sheet metal between said conductor and brush.

8. The combination of a brush having an opening therein, a conductor in said opening spaced therefrom, and a compressed mass of thin sheet metal between said conductor and brush.

9. The combination of a brush having an opening therein, a conductor in said opening and a compressed mass of thin sheet copper between said conductor and brush.

10. The combination of a brush having an opening therein, a conductor in said opening, a copper foil wrapping around the end of said conductor, said wrapping being compressed to a sufficient degree to produce intimate contact between said wrapper and the conductor and brush.

11. The combination of a brush having an opening therein, a cable in said opening, and a wrinkled, laminated, metallic filling between said cable and brush adapted to retain the cable in the opening.

In testimony whereof, I hereunto affix my signature.

PHILIP P. NUNGESSER.